(12) United States Patent
Nishio et al.

(10) Patent No.: US 11,511,653 B2
(45) Date of Patent: Nov. 29, 2022

(54) PALM REST ASSEMBLIES, CONSOLE ASSEMBLIES, AND VEHICLES INCORPORATING THE SAME

(71) Applicant: Toyoda Gosei Co., Ltd., Kiyosu (JP)

(72) Inventors: Kazunari Nishio, Wixom, MI (US); Roy Thorsell, Wixom, MI (US); Jake McNamara, Livonia, MI (US)

(73) Assignee: TOYODA GOSEI CO., LTD., Kiyosu (JP)

( * ) Notice: Subject to any disclaimer, the term of this patent is extended or adjusted under 35 U.S.C. 154(b) by 49 days.

(21) Appl. No.: 17/137,834

(22) Filed: Dec. 30, 2020

(65) Prior Publication Data

US 2022/0203876 A1 Jun. 30, 2022

(51) Int. Cl.
*B60N 2/70* (2006.01)
*B60N 2/75* (2018.01)
*B60N 3/10* (2006.01)

(52) U.S. Cl.
CPC ............. *B60N 2/793* (2018.02); *B60N 3/101* (2013.01)

(58) Field of Classification Search
CPC .......... B60N 2/793; B60N 2/79; B60N 2/797; B60N 2/75; B60N 3/101

USPC ........................................................ 297/411

See application file for complete search history.

(56) References Cited

U.S. PATENT DOCUMENTS

| | | | |
|---|---|---|---|
| 2007/0018493 A1 | 1/2007 | Kawachi et al. | |
| 2010/0090491 A1* | 4/2010 | Hipshier | B60R 7/04 296/24.34 |

FOREIGN PATENT DOCUMENTS

| | | | |
|---|---|---|---|
| CN | WO2020177170 | * | 9/2020 |
| JP | 2009-104384 A | | 5/2009 |
| JP | 2015085736 | * | 5/2015 |

* cited by examiner

*Primary Examiner* — Mark R Wendell
(74) *Attorney, Agent, or Firm* — Dinsmore & Shohl LLP (57) ABSTRACT

A palm rest assembly includes a palm rest bracket and a palm rest pad. The palm rest assembly is for a console assembly of a vehicle. The center console assembly includes a console frame. The palm rest bracket includes a generally C-shape. The palm rest bracket includes a base wall, a side wall, and an upper wall. The base wall is mounted to the console frame. The side wall extends between the base wall and the upper wall such that the upper wall is cantilevered. The palm rest pad is coupled to the upper wall.

20 Claims, 6 Drawing Sheets

ND VEHICLES
PALM REST ASSEMBLIES, CONSOLE ASSEMBLIES, AND VEHICLES INCORPORATING THE SAME

TECHNICAL FIELD

The present specification generally relates to palm rest assemblies for console assemblies of vehicles and, more specifically, to palm rest assemblies having a floating type palm rest.

BACKGROUND

It has been known to provide passenger compartments of vehicles with console assemblies having palm rests upon which a palm of a user rests as fingers of the user operate an input to control a vehicle operation. In the previously known console assemblies, the palm rests are integrated with a center console or an armrest of the console assemblies. As the previously known palm rests are integrated with the console or the armrest, a space below the palm rest is difficult to access by the user.

Accordingly, there is a need for palm rest assemblies, console assemblies, and vehicles that provide a floating type palm rest to allow for increased access to a space below a palm rest assembly while providing sufficient rigidity to the palm rest assembly.

SUMMARY

In accordance with one embodiment, a palm rest assembly of a console assembly for a vehicle is provided. The palm rest assembly includes a palm rest bracket and a palm rest pad. The center console assembly includes a console frame. The palm rest bracket has a generally C-shape. The palm rest bracket includes a base wall, a side wall, and an upper wall. The base wall is mounted to the console frame. The side wall extends between the base wall and the upper wall such that the upper wall is cantilevered. The palm rest pad is coupled to the upper wall.

In accordance with another embodiment, a console assembly for a vehicle is provided. The console assembly includes a console frame, a palm rest bracket, a console panel, and a palm rest pad. The console frame is fixed to a floor of the vehicle. The palm rest bracket has a generally C-shape. The palm rest bracket includes a base wall, a side wall, and an upper wall. The base wall is mounted to the console frame. The side wall extends between the base wall and the upper wall such that the upper wall is cantilevered. The console panel is coupled to the console frame. The console panel is positioned between the upper wall and the base wall. The palm rest pad is coupled to the upper wall.

In accordance with another embodiment, a vehicle is provided. The vehicle includes a passenger compartment, a console frame, a palm rest bracket, a console panel, and a palm rest pad. The console frame is within the passenger compartment. The console frame is fixed to a floor of the vehicle. The palm rest bracket has a generally C-shape. The palm rest bracket includes a base wall, a side wall, and an upper wall. The base wall is mounted to the console frame. The side wall extends between the base wall and the upper wall such that the upper wall is cantilevered. The console panel is coupled to the console frame. The console panel is positioned between the upper wall and the base wall. The palm rest pad is coupled to the upper wall.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Vehicles according to the present specification include a passenger compartment having an instrument panel and at least two seats, such as a driver seat and a front passenger seat. Between the driver seat and the front passenger seat, and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly includes a palm rest assembly. The palm rest assembly includes a palm rest bracket and a palm rest pad. The palm rest bracket has a generally C-shape. The palm rest bracket includes a base wall, a side wall, and an upper wall. The base wall is mounted to the console frame. The side wall extends between the base wall and the upper wall such that the upper wall is cantilevered. The palm rest pad is coupled to the upper wall.

The console assembly also includes a console frame and a console panel. The console frame is fixedly secured to a floor of the vehicle. The console frame may also be fixedly secured to the instrument panel. The console panel is coupled to the console frame. The console panel provides a console surface of the console assembly. The console panel includes a cup holder portion, a storage recess, and a human machine interface. The cup holder portion includes at least one receptacle for retaining an object, such as a beverage container, therein. The storage recess defines a storage space. A wireless charging unit may be provided at the storage recess to wireless charge an electronic device received within the storage space of the storage recess. The human machine interface provides inputs configured to be operated by a finger of a user, such as a driver, to control various vehicle operations.

A portion of the console panel is positioned between the upper wall and the base wall of the palm rest bracket. The storage recess is positioned below the palm rest pad. The human machine interface being positioned forward of the palm rest pad in the vehicle longitudinal direction such that a palm of the user rests on the palm rest pad when the finger of the user operates the human machine interface.

The palm rest bracket extends in a vehicle lateral direction such that the storage space is accessible from a rear direction of the palm rest pad in the vehicle longitudinal direction, a front direction of the palm rest pad in the vehicle longitudinal direction, and only one lateral side direction of the palm rest pad in the vehicle lateral direction.

The embodiments disclosed herein may be configured to provide a floating type palm rest that allows for increased access to the storage space below the palm rest pad while providing sufficient rigidity to the palm rest assembly. The generally C-shape of the palm rest bracket and the positioning the palm rest bracket so as to extend in the vehicle lateral direction allows for the storage space to be accessible from the rear direction, the front direction, and only one lateral side direction.

The base wall, the side wall, and the upper wall of the palm rest bracket are formed as a one piece monolithic structure. By forming the palm rest bracket as a one piece monolithic structure increased rigidity is provided such that the upper wall may be cantilevered, specifically, the upper wall is only connected to or supported by the palm rest bracket at one side. The cantilevering of the upper wall, upon which the palm rest pad is coupled, provides the floating type palm rest of the palm rest assembly. The formation of the palm rest bracket as a one piece monolithic structure allows the upper wall to receive a load without deformation of the upper wall.

Various embodiments of the console assembly for the passenger compartment of the vehicle will be described in more detail herein.

As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Z-direction as depicted), and is transverse to the vehicle longitudinal direction. The term "vehicle vertical direction" refers to the upward-downward direction of the vehicle (i.e., in the +/−vehicle Y-direction as depicted). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about the vehicle centerline, the direction to which use of terms "inboard" or "outboard" and refer may be mirrored about the vehicle centerline when evaluating components positioned along opposite sides.

Figure 1:
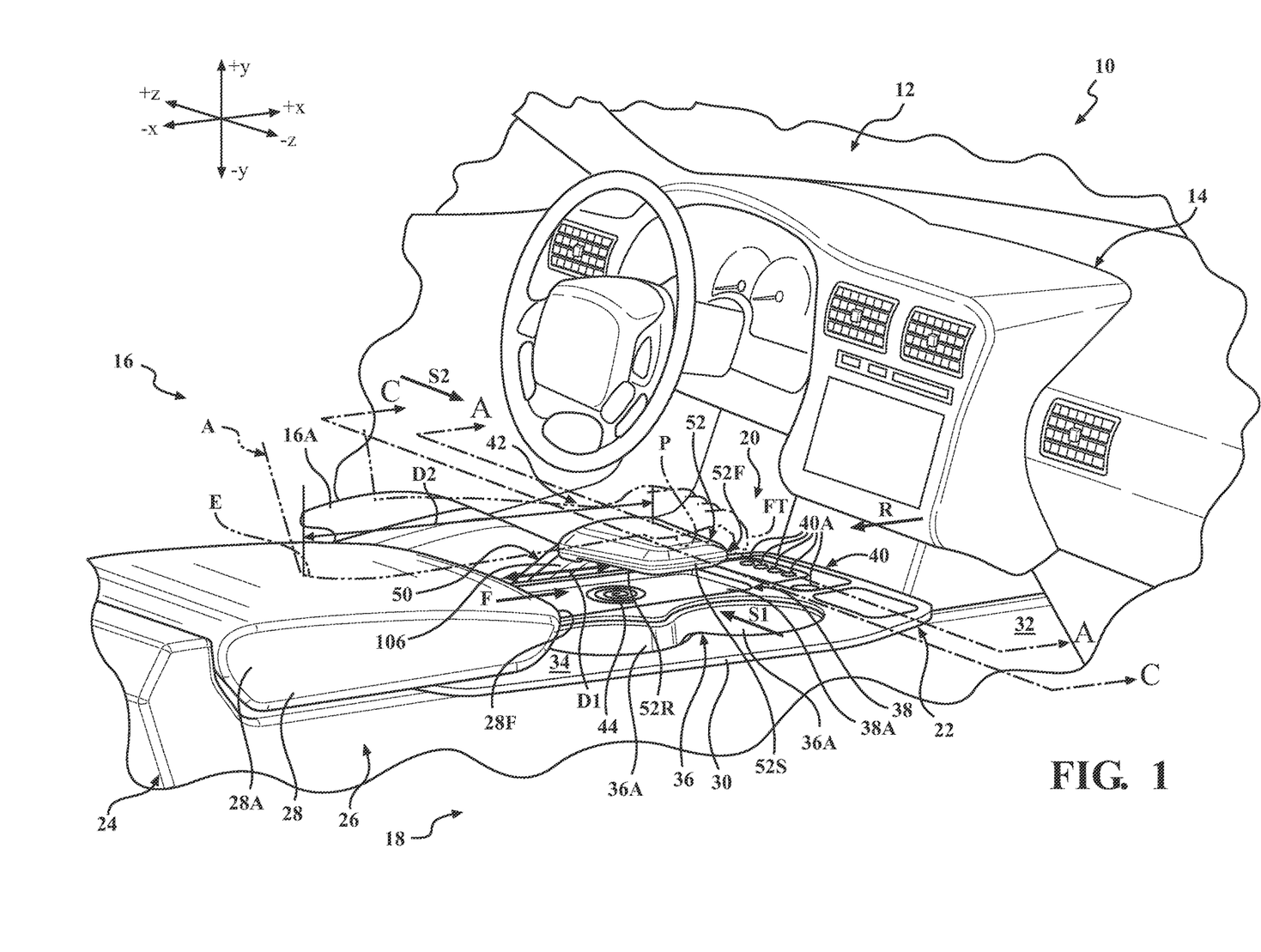
FIG. 1 schematically depicts a partial perspective view of a passenger compartment of a vehicle having a console assembly and a palm rest assembly, according to one or more embodiments described and illustrated herein.

Referring initially to FIG. 1, a partial perspective view of a passenger compartment 12 of a vehicle 10 is depicted. The passenger compartment 12 includes a driver seat area 16 and a front passenger seat area 18. An instrument panel 14 is provided within the passenger compartment 12.

The instrument panel 14 generally extends in the vehicle lateral direction and includes, without limitation, an instrument cluster, a radio, and a climate control cluster including a plurality of individual vents. The driver seat area 16 is the area in which a driver seat 16A is positioned. The front passenger seat area 18 is the area in which a front passenger seat (not shown) is positioned. Located forward of the driver seat are 16 are the vehicle driving controls such as, without limitation, a steering wheel, a gas pedal, and a brake pedal.

In some embodiments, the vehicle 10 is an autonomous vehicle in which no vehicle driving controls are provided. In such an embodiment, the passenger compartment 12 includes another front passenger seat area in place of the driver seat area 16 and the driver seat 16A is front passenger seat. It should be appreciated that the passenger compartment 12 may include a plurality of passenger seats rearward of the front passenger seat area 18 in the vehicle longitudinal direction. In some embodiments Generally, between the driver seat area 16 and the front passenger seat area 18 is a console assembly 20. The console assembly 20 generally extends in the vehicle longitudinal direction extending from the instrument panel 14 ending at or slightly beyond a rear surface of the driver seat 16A and the front passenger seat. Further, the console assembly 20 generally extends in the vehicle lateral direction an equal distance outwardly from a vehicle centerline, limited in width by the distance between the driver seat 16A and the front passenger seat. The console assembly 20 includes a forward portion 22 and a rearward portion 24. The forward portion 22 being closer to the instrument panel 14 than the rearward portion 24. In some embodiment, the forward portion 22 is coupled to the instrument panel 14.

Disposed within the rearward portion 24 of the console assembly 20 is a storage compartment 26. The storage compartment 26 may be integrated with the console assembly 20. In some embodiments, the storage compartment 26 is integrated with the console assembly 20 and the instrument panel 14. In some other embodiments, the storage compartment 26 may be separated from the console assembly 20, the instrument panel 14, or both. The storage compartment 26 may include a lid 28. The lid 28 may be configured as an arm rest such that an arm A of the user, such as the driver, specifically, an elbow E, rests on the lid 28.

The lid 28 is hindgely coupled to the storage compartment 26 by a hinge 28A. The lid 28 is pivotal about the hinge 28A between a closed position and an open position. In the closed position, the lid 28 inhibits access to a storage space or a storage area of the storage compartment 26. In the open position, the lid 28 permits access to the storage area of the storage compartment 26.

The console assembly 20 also includes a console panel 30 and a pair of side panels 32. The console panel 30 extends from the storage compartment 26 to the instrument panel 14. In some embodiments, the console panel 30 is coupled to the instrument panel 14 at the forward portion 22 and the console panel 30 is coupled to the storage compartment 26 at the rearward portion 24. The side panels 32 are provided on either side of the console assembly 20 in the vehicle lateral direction. Each of the side panels 32 extend from the forward portion 22 to the rearward portion 24.

The console panel 30 includes a console surface 34 that defines a portion of an upper exterior of the console assembly 20. In some embodiments, the console panel 30 may include a single panel or may include a plurality of components that are coupled together to form the console panel 30. The console panel 30 may also include a cup holder portion 36, a storage recess 38, a human machine interface 40, and a palm rest assembly 42.

The cup holder portion 36 includes at least one receptacle 36A recessed with respect to the console surface 34. The receptacles 36A are configured to receive and retain objects, such as beverage containers, therein.

The storage recess 38 is a portion of the console panel 30 that is recessed with respect to the console surface 34. The storage recess 38 defines a storage area or storage space 38A. As described in greater detail below, the console assembly 20 may also include a wireless charging unit 44 at the storage recess 38 to wireless charge an electronic device 46 received within the storage space 38A of the storage recess 38. The electronic device 46 may be a mobile telephone other types of electronic devices configured to receive electronic power wirelessly.

The human machine interface 40 is configured to receive inputs from the user to control various vehicle operations. The human machine interface 40 includes at least one input 40A (hereinafter referred to as input 40A). The input 40A is configured to be operated by the user. In some embodiments, the human machine interface 40 may be a touch screen and the input 40A may be a button, switch, slider, rotary knob displayed on the touch screen. In some embodiments, the input 40A may be a physical inputs such as a button, switch, slider, or rotary knob.

The human machine interface 40 allows the user to control various vehicle operations upon actuation of the input 40A. For example, the input 40A may control various vehicle operations including, but not limited to, climate control, navigation systems, hands free communications, infotainment systems, audio systems, vehicle operation modes (e.g. sports mode, economy mode, electric vehicle mode, regenerative braking mode), door lock and unlocking, and window opening and closing.

Figure 4:
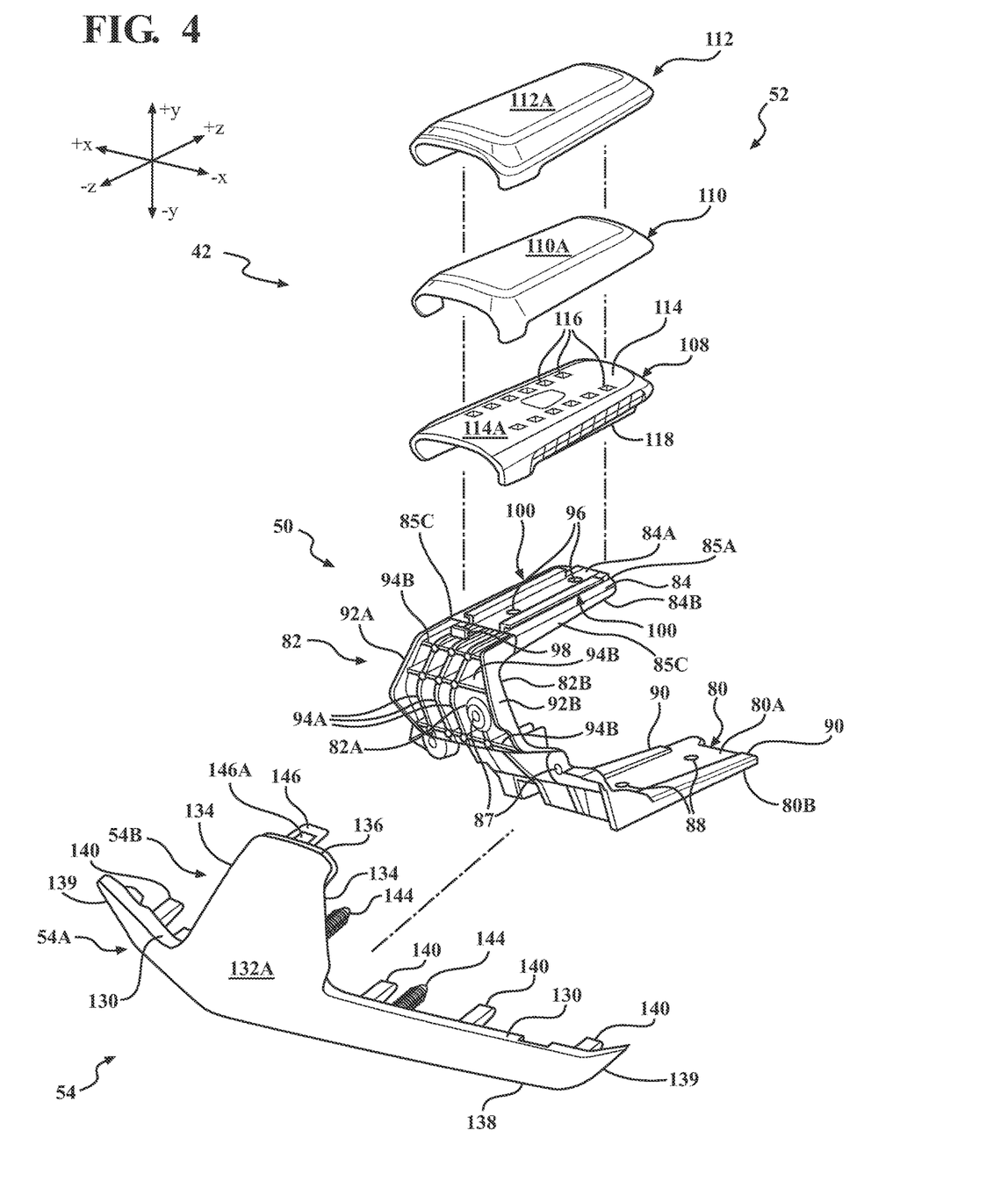
FIG. 4 schematically depicts an exploded view of the palm rest assembly of FIG. 1, according to one or more embodiments described and illustrated herein FIG. 5A schematically depicts a partial cross sectional view of the palm rest assembly taken along the line A-A of FIG. 1 in isolation, according to one or more embodiments described and illustrated herein.

The palm rest assembly 42 is configured to provide a palm rest for a palm P of the user. Referring to FIG. 4, the palm rest assembly 42 includes a palm rest bracket 50, a palm rest pad 52, and a cover panel 54. Referring back to FIG. 1, the palm rest assembly 42 is provided on the console assembly 20 such that the human machine interface 40 is positioned forward of the palm rest assembly 42, specifically, the palm rest pad 52, in the vehicle longitudinal direction. The human machine interface 40 being positioned forward of the palm rest pad 52 in the vehicle longitudinal direction such that the palm P of the user rests on the palm rest pad 52 when a finger FT of the user operates the inputs 40A of the human machine interface 40. As such, the palm rest pad 52 is configured as a palm rest for the palm P of the user.

The palm rest assembly 42 is provided on the console assembly 20 such that the palm rest pad 52 is disposed above the storage space 38A of the storage recess 38. In some embodiments, the storage space 38A may is defined by the space between the console surface 34 and the palm rest pad 52. As will be described in greater detail below, the palm rest assembly 42 is a floating type palm rest in which the palm rest pad 52 is spaced apart from the console surface 34 of the console panel 30 and the storage compartment 26.

The palm rest pad 52 extends in a vehicle lateral direction such that the storage space 38A of the storage recess 38 is accessible from a rear direction R of the palm rest pad 52 in the vehicle longitudinal direction, a front direction F of the palm rest pad 52 in the vehicle longitudinal direction, and only one lateral side direction S1 of the palm rest pad 52 in the vehicle lateral direction. The only one lateral side direction S1 of the palm rest pad 52 is a direction extending outwardly from a center portion of the console assembly 20 in the vehicle lateral direction, specifically an outboard direction from the center portion of the console assembly 20 in the vehicle lateral direction. However, the only one lateral side direction is not limited to the lateral side direction S1 as, in some embodiments, the palm rest assembly 42 may be flipped such that the storage space 38A is only accessible from the lateral side direction S2, in the vehicle lateral direction.

As shown in FIG. 1, the palm rest pad 52 is only connected to the palm rest bracket 50 such that a front edge 52F, a rear edge 52R, and a distal side edge 52S of the palm rest pad 52 is spaced apart from the console surface 34 of the console panel 30. By allowing access to the storage space 38A of the storage recess 38 in only one lateral side direction S1, in the vehicle lateral direction, and both the front direction F and the rear direction R, in the vehicle longitudinal direction, permits the user to easily store objects in and retrieve objects from storage space 38A of the storage recess 38. As shown in FIG. 1, the palm rest bracket 50 and the cover panel 54 inhibit access to the storage space 38A from the lateral side direction S2 which is opposite the lateral side direction S1.

The palm rest pad 52 is spaced apart from the remaining components of the console assembly 20. Specifically, the palm rest pad 52 is only directly connected to the palm rest bracket 50. As such, the palm rest pad 52 is spaced apart from the lid 28 of the storage compartment 26 and the palm rest pad 52 is spaced apart from the instrument panel 14.

In some embodiments, the palm rest pad 52 is spaced apart from the lid 28 of the storage compartment 26 by a distance D1. In some embodiments, the distance D1 is a distance between a front edge 28F of the lid 28 and the rear edge 52R of the palm rest pad 52. As shown in FIG. 1, the distance D1 is less than a distance D2 between an elbow E and a palm P of the user. In some embodiments, the distance D1 is a predetermined distance that is less than a distance between an elbow and palm of an AM 95 SAE (Society of Automotive Engineering) standard model ±5%, 10%, 15, 20%, or 25%. In some embodiments, the distance D1 is a predetermined distance that is less than a distance between an elbow and palm of an AF 5 SAE standard model ±5%, 10%, 15, 20%, or 25%.

As shown in FIG. 1, the arm A of the user is permitted to extend between the lid 28 and the palm rest pad 52. Specifically, the elbow E of the user rests on the lid 28 and the palm P of the user rests on the palm rest pad 52. As such, the palm P of the user rests on the palm rest pad 52 when the finger FT of the user operates the input 40A of the human machine interface 40 to control various vehicle operations.

Figure 2:
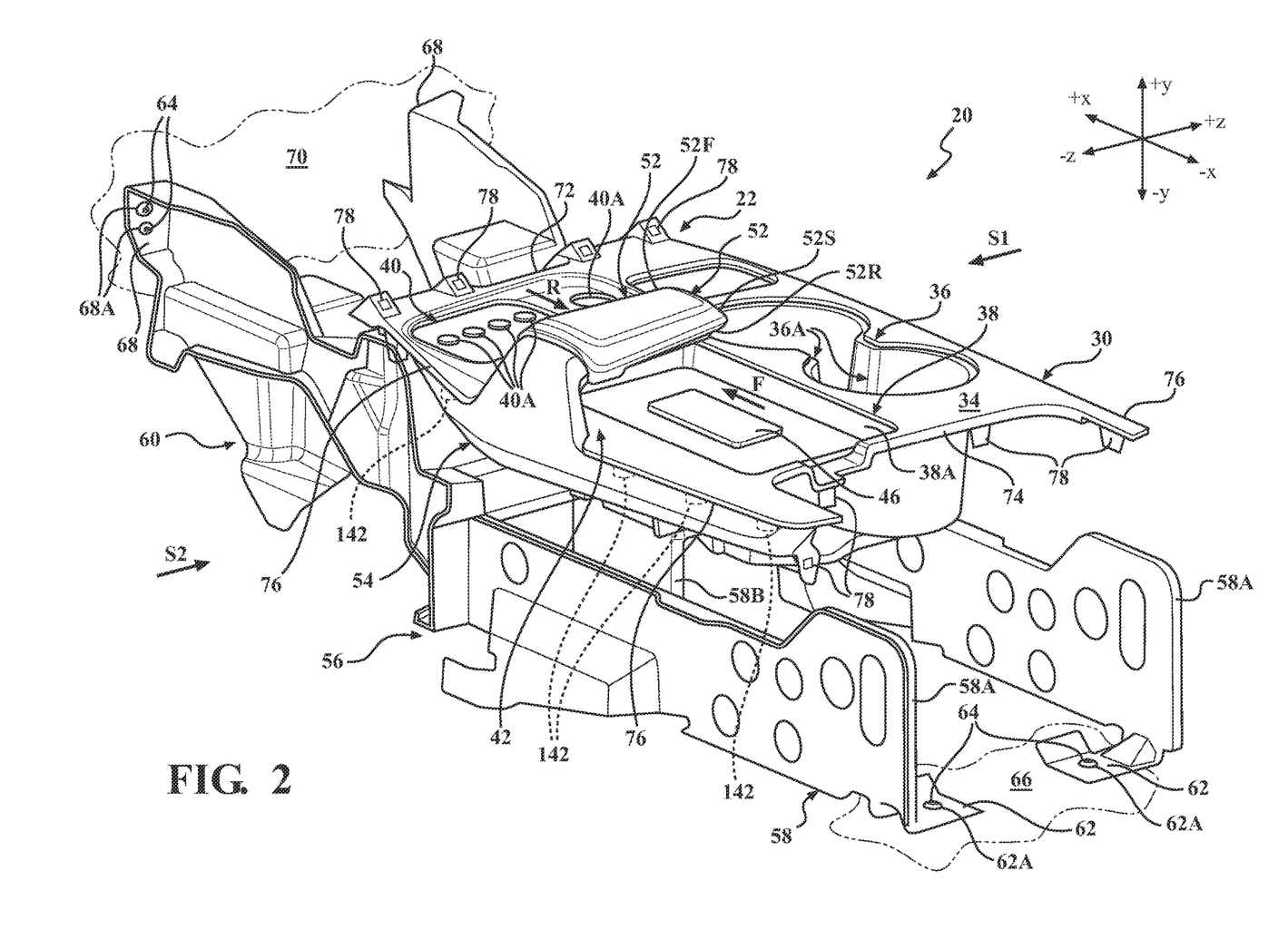
FIG. 2 schematically depicts a partial perspective view of the console assembly of FIG. 1 in which a console frame and a console panel are illustrated, according to one or more embodiments described and illustrated herein.

Referring to FIG. 2, a partial perspective view of the console assembly 20 is illustrated. In FIG. 2, the instrument panel 14, the storage compartment 26, and the side panels 32 have been removed. The console assembly 20 further includes a console frame 56. The console frame 56 is fixedly secured to vehicle 10. The console frame 56 includes a rearward portion 58 and a forward portion 60.

The rearward portion 58 includes at least one flange 62 that includes a bore 62A through which a fastener 64 extends to fixedly secure the rearward portion 58 of the console frame 56 to a floor 66 of the vehicle 10. The forward portion 60 includes at least one flange 68 that includes a bore 68A through which fasteners 64 extends to fixedly secure the forward portion 60 of the console frame 56 to a vehicle component 70. In some embodiments, the vehicle component 70 is an instrument panel frame upon which the instrument panel 14 is coupled. In some other embodiments, the component 70 is a firewall that separates the passenger compartment 12 from an engine compartment (not shown). In some other embodiments, the forward portion 60 of the console frame 56 may be fixedly secured to the floor 66 of the vehicle 10. In some embodiments, the fasteners 64 may be screws, bolts, rivets, welds, adhesives, or any other known techniques to fixedly secure one component to a second component.

The console frame 56 supports the console assembly 20 above the floor 66 of the vehicle 10. Specifically, the console frame 56 supports the console panel 30, the side panels 32, the cup holder portion 36, the storage recess 38, the wireless charging unit 44, the human machine interface 40, and the palm rest assembly 42 above the floor 66 of the vehicle 10. In some embodiments, the console frame 56 may also support the storage compartment 26 above the floor 66 of the vehicle 10. In some embodiments, the rearward portion 58 of the console frame 56 includes a pair of side frames 58A and a mounting frame 58B that extends between the pair of side frames 58A.

Still referring to FIG. 2, the console panel 30 includes a front edge 72, an opposite rear edge 74, and a pair of side edges 76 that extend between the front edge 72 and the rear edge 74. The console panel 30 includes a plurality of connectors 78 disposed alone the front edge 72, the rear edge 74, and the pair of side edges 76. The plurality of connectors 78 are configured to couple the console panel 30 to the console frame 56 and to the instrument panel 14. The plurality of connectors 78 may also be configured to couple the side panels 32 to the console panel 30. The plurality of connectors 78 may also be configured to couple the cover panel 54 of the palm rest assembly 42 to the console panel 30 and console frame 56.

Figure 3:
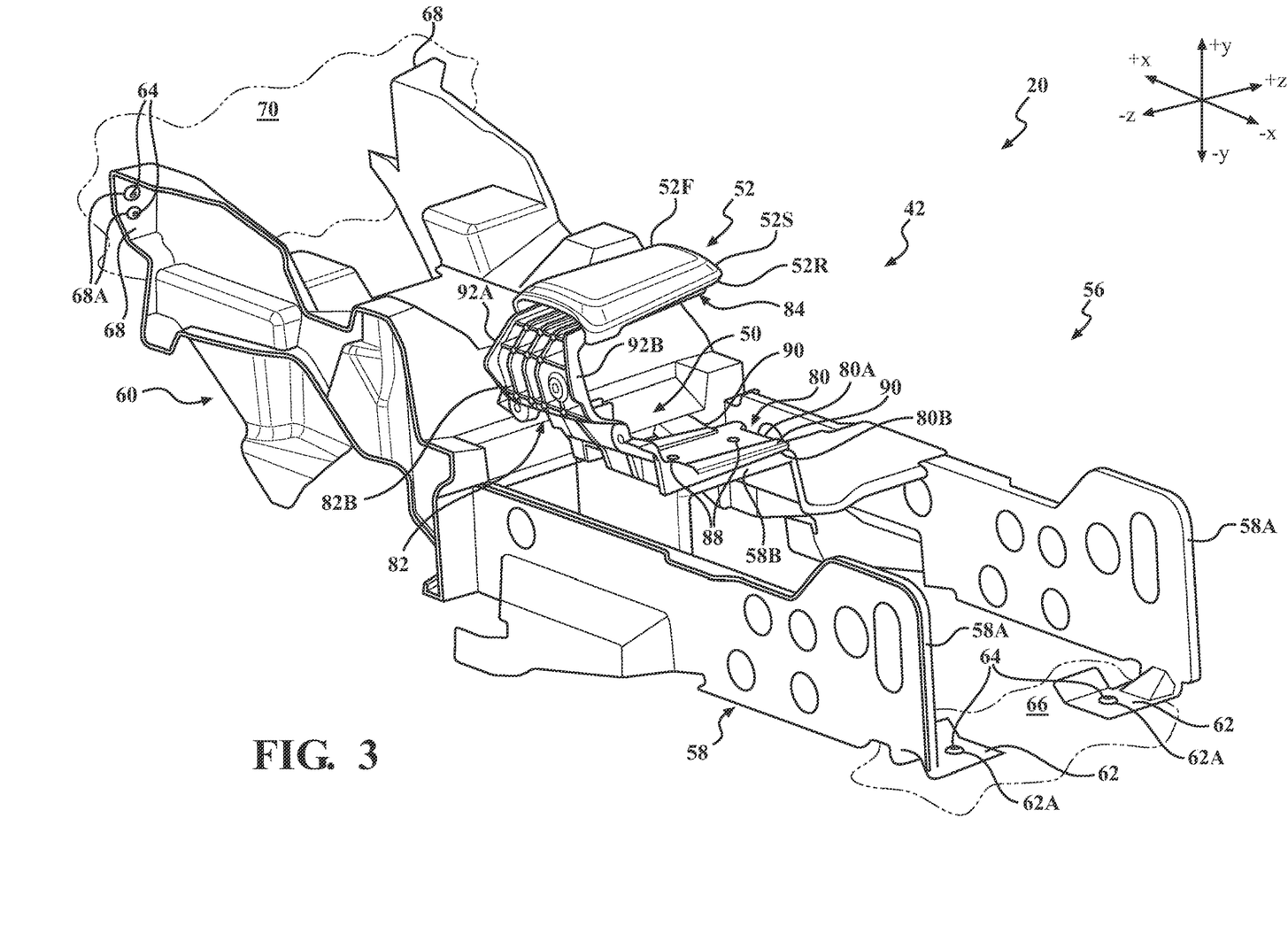
FIG. 3 schematically depicts a partial perspective view of the palm rest assembly coupled to the console frame with the console panel removed, according to one or more embodiments described and illustrated herein.

Referring to FIGS. 3 and 4, the palm rest assembly 42 includes the palm rest bracket 50, the palm rest pad 52, and the cover panel 54. The palm rest bracket 50 has a generally C-shape when viewed from the rear in the vehicle longitudinal direction. The palm rest bracket 50 includes a base wall 80, a side wall 82, and an upper wall 84. The base wall 80 is mounted to the console frame 56. The side wall 82 extends between the base wall 80 and the upper wall 84 such that the upper wall 84 is cantilevered by the side wall 82. Specifically, the upper wall 84 is cantilevered as only one end of the upper wall 84 is connected to the remainder of the palm rest bracket 50, specifically, only one end of the upper wall 84 is connected to the side wall 82.

The base wall 80 is a generally planar shaped member having an upper surface 80A and an opposite bottom surface 80B. A plurality of through-bores 88 are formed in the base wall 80. The through-bores 88 extend between the upper surface 80A and the bottom surface 80B. The base wall 80 includes a pair of reinforcement protrusions 90 that extend across the base wall 80 in the vehicle lateral direction. The reinforcement protrusions 90 provide additional rigidity to the base wall 80 to inhibit the movement of the side wall 82 with respect to the base wall 80. The base wall 80 is mounted to the console frame 56. As discussed in greater detail below, the base wall 80 is fixedly secured to the mounting frame 58B of the console frame 56 by a plurality of fasteners 86.

The side wall 82 extends between the base wall 80 and the upper wall 84. The side wall 82 includes an interior surface 82A and an opposite exterior surface 82B. The side wall 82 includes a front side edge 92A and an opposite rear side edge 92B. The interior surface 82A extends between the front side edge 92A and the rear side edge 92B. The interior surface 82A has a general smooth surface.

The exterior surface 82B includes a plurality of first reinforcement ribs 94A and a plurality of second reinforcement ribs 94B. The plurality of first reinforcement ribs 94A extend from the exterior surface 82B of the side wall 82 in a first direction and the plurality of second reinforcement ribs 94B extend in a second direction that is different from the first direction. In some embodiments, the plurality of first reinforcement ribs 94A extend in the vehicle vertical direction, and the plurality of second reinforcement ribs 94B extend in the vehicle longitudinal direction. The plurality of first reinforcement ribs 94A and the plurality of second reinforcement ribs 94B reinforce the palm rest bracket 50 to inhibit torsional movement of the side wall 82. Specifically, the plurality of first reinforcement ribs 94A and the plurality of second reinforcement ribs 94B reinforce the palm rest bracket 50 to inhibit movement of the side wall 82 and the upper wall 84 upon an input of a load to the upper wall 84.

The exterior surface 82B of the side wall 82 may also include bores 87. In some embodiments, the bores 87 are formed to be through-holes such that fasteners securely fix the palm rest bracket 50 to the interior surface 132B of the cover panel 54. As will be discussed in greater detail below, the bores 87 are configured to facilitate the engagement of the cover panel 54 to the palm rest bracket 50, specifically, the side wall 82.

The upper wall 84 includes an upper surface 84A and an opposite lower surface 84B. The upper wall 84 includes a distal end 85A, an opposite proximate end 85B, and a pair of side edges 85C that extend between the proximate end 85B and the distal end 85A. The upper wall 84 is cantilevered with respect to the remainder of the palm rest bracket 50, as only the proximate end 85B of the upper wall 84 is fixed or connected to the side wall 82. As described herein, the upper wall 84 being cantilevered means that the upper wall 84 is only supported at one end, specifically, the upper wall 84 is only fixed or supported at the proximate end 85B. Accordingly, the upper wall 84 is cantilevered as the only connection between the upper wall 84 and the remainder of the palm rest bracket 50 is the connection between the proximate end 85B of the upper wall 84 and the side wall 82. Specifically, the distal end 85A and the pair of side edges 85C of the upper wall 84 are not connected to the side wall 82 or the base wall 80.

A plurality of through-holes 96 are formed in the upper wall 84. The plurality of through-holes 96 extend between the upper surface 84A and the lower surface 84B of the upper wall 84. The upper wall 84 may also include a tab 98 that extends upwardly from the upper surface 84A of the upper wall 84 at junction between the upper wall 84 and the side wall 82.

Figure 5A:
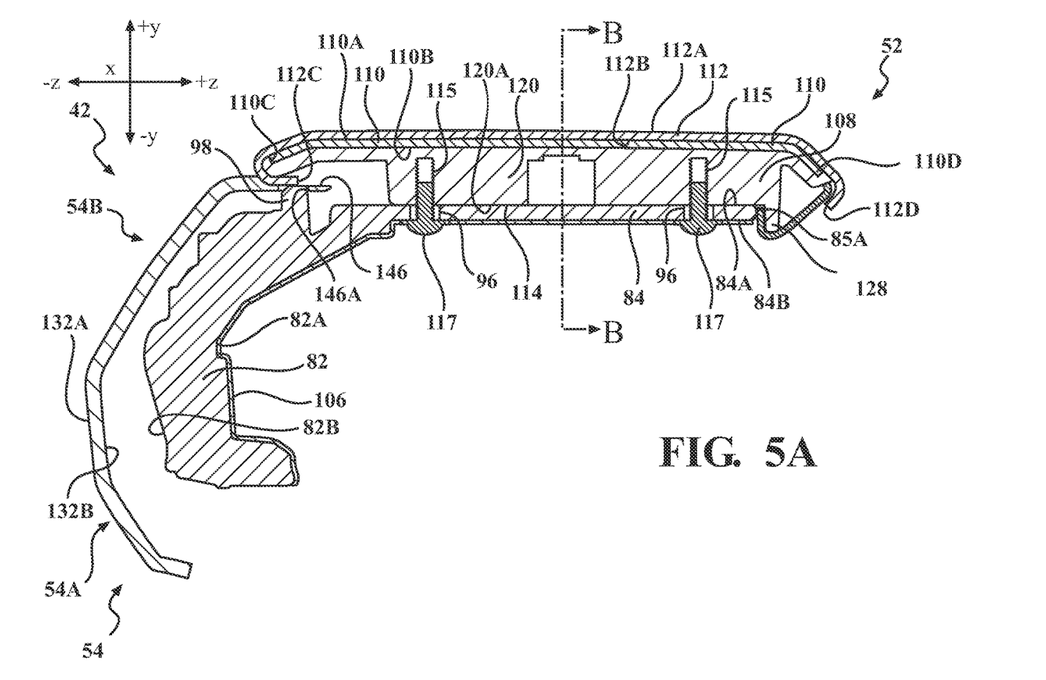
Figure 6:
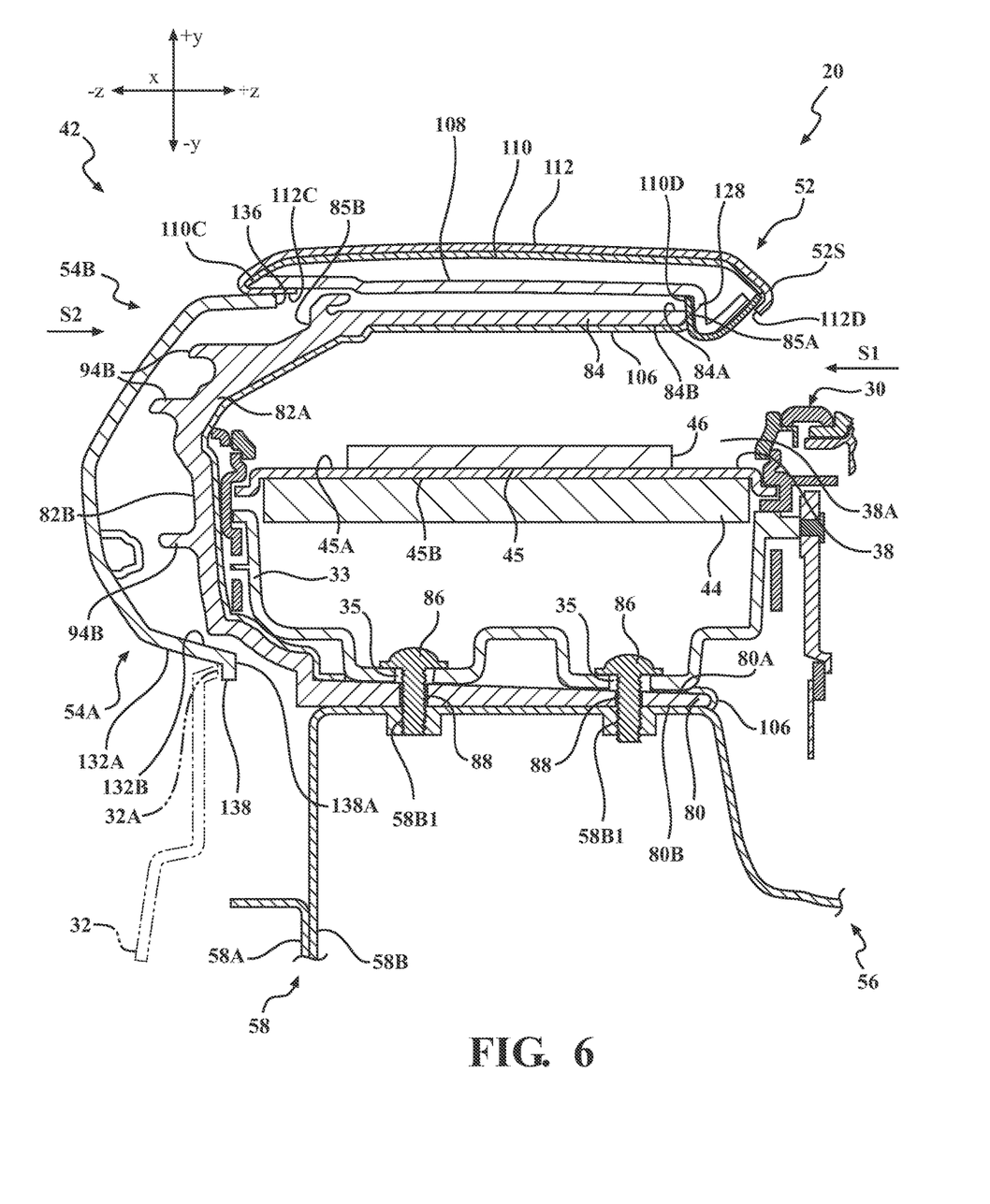
FIG. 6 schematically depicts a partial cross sectional view of the palm rest assembly taken along line C-C of FIG. 1, according to one or more embodiments described and illustrated herein.

Referring to FIGS. 2-4, at least a portion of the side wall 82 may be acutely or obliquely angled with respect to the vehicle vertical direction such that the upper wall 84 is offset with respect to the base wall 80 in the vehicle longitudinal direction. Specifically, the upper wall 84 is positioned forward of the base wall 80 in the vehicle longitudinal direction. As shown in FIG. 5A, which is a cross sectional view taken along a center line of the upper wall 84 in the vehicle lateral direction, the base wall 80 is illustrated as the base wall 80 is positioned rearward of the upper wall 84 in the vehicle longitudinal direction. As shown in FIG. 6, which is a cross sectional view taken along a line rearward of the center line of the upper wall 84, in the vehicle lateral direction, the base wall 80 is illustrated.

Figure 5B:
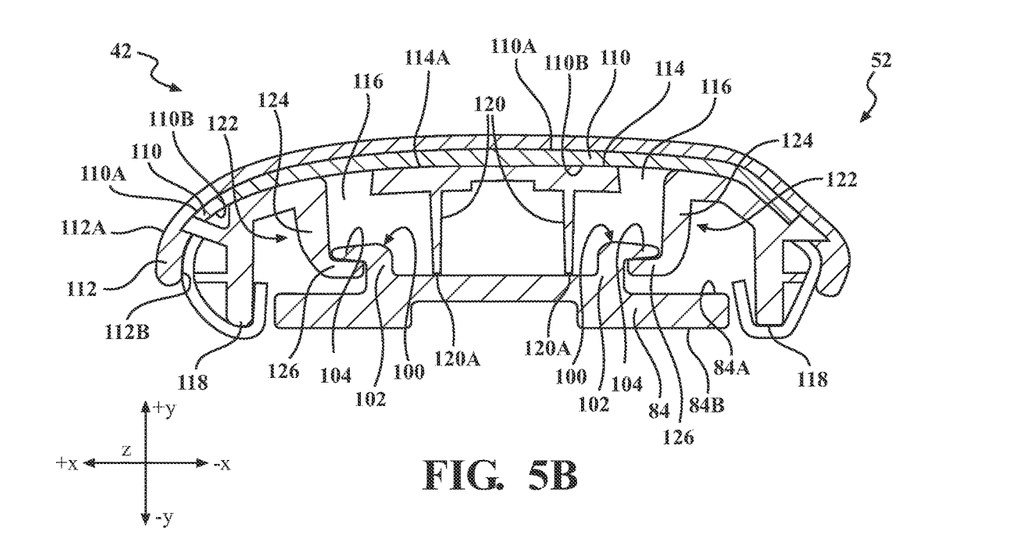
FIG. 5B schematically depicts a partial cross sectional view of the palm rest assembly taken along the line B-B of FIG. 5A, according to one or more embodiments described and illustrated herein.

The upper wall 84 may also include elongated first connectors such as elongated hooks 100 that extends outwardly from the upper surface 84A of the upper wall 84. As shown in FIGS. 4 and 5B, the upper wall 84 includes a pair of elongated hooks 100. Each of the pair of elongated hooks 100 extends in the vehicle lateral direction. Each of the pair of hooks 100 includes a projection 102 and an arm 104. Each of the projections 102 extend outwardly from the upper surface 84A of the upper wall 84. Each of the arms 104 extend outwardly from a distal end of the projections 102. As shown in FIGS. 4 and 5B, the arms 104 extend outwardly in opposite directions in the vehicle longitudinal direction. Specifically, a forward most arm 104 extends forwardly in the vehicle longitudinal direction and the rearward most arm 104 extends rearwardly in the vehicle longitudinal direction. In some embodiments, the arms 104 extends inwardly in opposite directions in the vehicle longitudinal direction. In such an embodiments, the forward most arm 104 extends rearwardly in the vehicle longitudinal direction and the rearward most arm 104 extends forwardly in the vehicle longitudinal direction.

In some embodiments, the base wall 80, the side wall 82, and the upper wall 84 of the palm rest bracket 50 are integrally formed as a one-piece monolithic structure. Specifically, the palm rest bracket 50 may be integrally formed so that the base wall 80, the side wall 82, and the upper wall 84 are a single one-piece monolithic structure.

In some embodiments, the base wall 80, the side wall 82, and the upper wall 84 of the palm rest bracket 50 are integrally casted as a one-piece monolithic structure. Specifically, the palm rest bracket 50 may be integrally casted so that the base wall 80, the side wall 82, and the upper wall 84 are a single one-piece monolithic structure.

In some embodiments, the palm rest bracket 50, including the base wall 80, the side wall 82, and the upper wall 84, is cast or formed of a metallic material. In some embodiments, the palm rest bracket 50, including the base wall 80, the side wall 82, and the upper wall 84, is cast or formed of magnesium. In some embodiments, the palm rest bracket 50, including the base wall 80, the side wall 82, and the upper wall 84, is cast or formed of a magnesium alloy.

As described in greater detail below, at least a portion of the lower surface 84B of the upper wall 84, the interior surface 82A of the side wall 82, and the upper surface 80A of the base wall 80 are covered with a surface coating layer 106. The surface coating layer 106 provides an atheistically pleasing appearance to an inner portion of the palm rest bracket 50, specifically, the lower surface 84B of the upper wall 84, the interior surface 82A of the side wall 82, and the upper surface 80A of the base wall 80. In some embodiments, only the lower surface 84B of the upper wall 84 and the interior surface 82A of the side wall 82 are covered with the surface coating layer 106 as the upper surface 80A of the base wall 80 is not visible when the palm rest assembly 42 is installed in the console assembly 20.

In some embodiments, the surface coating layer 106 is a powder coating layer in which a free-flowing dry powder is applied electrostatically and then cured using heat or ultraviolet light. In some embodiments, the surface coating layer 106 is an electroplated layer in which a coat of a metallic material is applied by an electric current. In some embodiments, the surface coating layer 106 is a painted layer that is applied as a liquid and dried with or without an evaporating solvent. In some embodiments, the surface coating layer 106 has a black color; however, the color of the surface coating layer 106 is not limited to black.

Referring to FIGS. 4-5B, the palm rest pad 52 includes a substrate 108, an intermediate layer 110, and a cover layer 112. The substrate 108 may be formed of a rigid material such as a rigid plastic material to provide rigidity to the palm rest pad 52. The substrate 108 includes an upper portion 114 having a plurality of apertures 116.

Referring to FIG. 5B, the substrate 108 includes a pair of side edges 118 and a pair of ribs 120 that extend downwardly from the substrate 108. The pair of ribs 120 are positioned between the pair of side edges 118. The pair of side edges 118 extend farther downwardly from the upper portion 114 than the pair of ribs 120. The substrate 108 also includes a pair of substrate bores 115. The substrate bores 115 may be internally threaded.

The substrate 108 may also include elongated second connectors such as elongated hooks 122. As shown in FIG. 5B, the substrate 108 includes a pair of elongated hooks 122. Each of the pair of elongated hooks 122 extends in the vehicle lateral direction. Each of the pair of hooks 122 includes a projection 124 and an arm 126. Each of the projections 124 extend downwardly from a lower surface of the upper portion 114 of the substrate 108. Each of the arms 126 extend outwardly from a distal end of the projections 124. As shown in FIG. 5B, the arms 126 are configured to extend opposite from the arms 104 of the upper wall 84. In the illustrated embodiment, the arms 126 extend inwardly, in the vehicle longitudinal direction, when the arms 104 extend outwardly, in the vehicle longitudinal direction. In some embodiment, the arms 126 extend outwardly, in the vehicle longitudinal direction, when the arms 104 extend inwardly, in the vehicle longitudinal direction. As will be described in greater detail below, the hooks 100 on the upper wall 84 and the hooks 122 are configured to engage to slidably connect the palm rest pad 52 to the upper wall 84 of the palm rest bracket 50.

The intermediate layer 110 of the palm rest pad 52 includes an upper surface 110A and an opposite lower surface 110B. The intermediate layer 110 also includes a proximate end 110C and an opposite distal end 110D. In some embodiments, the intermediate layer 110 is a cushion layer formed of a foam material. For example, the intermediate layer 110 may be formed of an open cell or closed cell foam material such as a polyurethane foam or a foam rubber (synthetic rubber, natural rubber or latex that has been manufactured with a foaming agent to create an air-filled matrix structure). The intermediate layer 110 provides cushioning between the palm P of the user and the substrate 108 to provide a soft feel to the palm rest pad 52.

The cover layer 112 is an outermost layer of the palm rest pad 52. The cover layer 112 includes an upper surface 112A and an opposite lower surface 112B. The cover layer 112 also includes a proximate end 112C and an opposite distal end 112D. The cover layer 112 is formed of an upholstery material to provide both an aesthetically pleasing appearance and an aesthetically pleasing tactile experience. In some embodiments, the cover layer 112 may be formed of a natural or synthetic fabric material, such a woven or unwoven fabrics, or non-fabric materials, such a natural or synthetic layer. In some embodiments, the cover layer 112 is formed of a natural or synthetic material. The upper surface 112A of the cover layer 112 is the surface that contacts the palm P of the user.

The palm rest pad 52 is assembled by fixing the intermediate layer 110 to the substrate 108. Specifically, the lower surface 110B of the intermediate layer 110 is provided so as to contact an upper surface 114A of the upper portion 114 of the substrate 108. The cover layer 112 is fixed to the intermediate layer 110 such that the lower surface 112B of the cover layer 112 contacts the upper surface 110A of the intermediate layer 110. The upper surface 112A of the cover layer 112 is exposed to the passenger compartment 12 of the vehicle 10.

In some embodiments, the intermediate layer 110 and the cover layer 112 are affixed to together and to the substrate 108 by an adhesive. In some other embodiments, the intermediate layer 110 covers the entire upper portion 114 of the substrate 108 such that the substrate 108 is not visible upon attachment of the palm rest pad 52 to the palm rest bracket 50. In some embodiments, the distal end 110D of the intermediate layer 110 extends around a stopper 128 of the substrate 108. Referring to FIGS. 5A and 5B, the proximate end 112C of the cover layer 112 extends around both the proximate end 110C of the intermediate layer 110 and a portion of the substrate 108.

Referring to FIG. 4, the cover panel 54 includes a lower portion 54A and an upper portion 54B. The lower portion 54A and the upper portion 54B are delineated by a boundary edge 130. As shown in FIG. 4, the lower portion 54A and the upper portion 54B are contagious and include an exterior surface 132A and an opposite interior surface 132B. The lower portion 54A is defined by a bottom edge 138, a pair of side edges 139, and the boundary edge 130. The upper portion 54B is defined by a pair of side edges 134 that extend upwardly from the boundary edge 130 and a top edge 136 that extend between the pair of side edges 134. The pair of side edges 134 includes proximate ends connected to the boundary edge 130 and distal ends coupled to the top edge 136.

In some embodiments, the cover panel 54 is a decorative panel that covers at least a portion of the exterior surface 82B of the side wall 82. The cover panel 54 may be formed of a plastic material. In some embodiments, the cover panel 54 may include a plating, such as a chrome plating, on the exterior surface 132A.

The cover panel 54 includes a plurality of snap tabs 140 that extend from the interior surface 132B. The cover panel 54 may also include a plurality of clips 144 that extend outwardly from the interior surface 132B. The cover panel 54 may also include a connector 146 having an aperture 146A. The connector 146 extends from the interior surface 132B adjacent the top edge 136 of the upper portion 54B.

In order to facilitate a better understanding of the palm rest assembly 42, a discussion of the installation of the palm rest assembly 42 will now be provided. Initially, the palm rest bracket 50 is mounted to the console frame 56. The base wall 80 of the palm rest bracket 50 is positioned on the mounting frame 58B such that the through-bores 88 are aligned with apertures 58B1 formed in the mounting frame 58B. In some embodiments, an interior panel 33 is provided in contact with the upper surface 80A of the base wall 80 such that apertures 35 align with the through-bores 88 of the base wall 80 and the apertures 58B1 of the mounting frame 58B. Fasteners 86 are inserted through the apertures 35 of the interior panel 33, the through-bores 88 of the base wall 80, and the apertures 58B1 of the mounting frame 58B to fixedly secure the palm rest bracket 50 to the console frame 56. As such, the palm rest bracket 50 is directly fixed to the console frame 56 which is directly fixed to the floor 66 of the vehicle 10. In some embodiments, the fasteners 86 are screws, bolts, rivets, adhesives, or welds.

After the palm rest bracket 50 is fixedly secured to console frame 56, the console panel 30 is coupled to the console frame 56 and, optionally the interior panel 33. As such, the console panel 30 is positioned between the upper wall 84 and the base wall 80 of the palm rest bracket 50 in the vehicle vertical direction. As shown in FIG. 2, the console panel 30 may be coupled to the console frame 56 by the connectors 78. In some embodiments, the cover panel 54 is coupled to the palm rest bracket 50 and the console panel 30. The snap tabs 140 of the cover panel 54 are aligned with receiving slits 142 formed on the console panel 30, as shown in FIG. 2. The engagement of the snap tabs 140 within the receiving slits 142 couples the cover panel 54 to the console panel 30. The lower portion 54A of the cover panel 54 is positioned at or below the console surface 34 of the console panel 30. The upper portion 54B of the cover panel 54 extends above the console surface 34 of the console panel 30.

The cover panel 54 may also be coupled directly to the palm rest bracket 50 by the engagement of the clips 144 and the side wall 82. In some embodiments, the bores 87 receive fasteners (not shown) that engage with the cover panel 54 to secure the cover panel 54 to the side wall 82 of the palm rest bracket 50. The cover panel 54 may also be directly coupled to the palm rest bracket 50 by the engagement of the connector 146 and the tab 98. Upon alignment and movement of the cover panel 54, the connector 146 abuts the tab 98 and deflects upwardly until the aperture 146A aligns with the tab 98 to inhibit movement of the cover panel 54 with respect to the palm rest bracket 50.

Upon attachment of the cover panel 54 to the palm rest bracket 50 and the console panel 30, as shown in FIG. 2, the side panels 32 are attached to the console frame 56, as shown in FIG. 1. The bottom edge 138 of the cover panel 54 includes a flange 138A that engages a distal end 32A of the side panels 32, as shown in FIG. 6.

Referring to FIGS. 4 and 5B, the palm rest pad 52 is installed onto the palm rest bracket 50 due to the engagement of the hooks 100 on the upper wall 84 and the hooks 122 on the substrate 108. Initially, the palm rest pad 52 is assembled by coupling the substrate 108, the intermediate layer 110, and the cover layer 112. Next, the assembled palm rest pad 52 is aligned with the upper wall 84 of the palm rest bracket 50 such that the pair of hooks 100 are aligned with the pair of hooks 122. Specifically, the upper wall 84 is positioned between the side edges 118 of the substrate 108 with the ribs 120 positioned between the pair of hooks 100. The arms 104 of the hooks 100 are positioned between the arms 126 of the hooks 122 and the lower surface of the upper portion 114, and the arms 126 of the hooks 122 are positioned between the arms 104 of the hooks 100 and the upper surface 84A of the upper wall 84. Upon alignment of the hooks 100 and the hooks 122, the palm rest pad 52 is moved in the vehicle lateral direction, specifically, the lateral side direction S1 such the hooks 100 engage with the hooks 122 to slidably couple the palm rest pad 52 to the palm rest bracket 50.

The palm rest pad 52 is slid in the vehicle lateral direction until the through-holes 96 of the upper wall 84 are aligned with the substrate bores 115 of the substrate 108. The through-holes 96 and the substrate bores 115 may be positioned such that upon contact of the distal end 85A of the upper wall 84 with the stopper 128 of the substrate 108, which prevents further movement of the palm rest pad 52 with respect to the palm rest bracket 50, the through-holes 96 and the substrate bores 115 are aligned. Upon alignment of the through-holes 96 and the substrate bores 115, fasteners 117 are inserted through the through-holes 96 and the substrate bores 115 to fixedly secure the palm rest pad 52 and the palm rest bracket 50. Upon attachment of the palm rest pad 52 to the palm rest bracket 50 by the fasteners 117, the palm rest pad 52 is inhibited from sliding with respect to the palm rest bracket 50.

Referring to FIGS. 1 and 6, the palm rest assembly 42 provides a rest for the palm P of the user when the fingers FT of the user operate the inputs 40A of the human machine interface 40. By providing the palm rest assembly 42 as a floating type palm rest, due to the cantilevered upper wall 84 and the attachment of the palm rest pad 52 to the upper wall 84, the storage space 38A is accessible in the vehicle longitudinal direction from the rear edge 52R of the palm rest pad 52 in the front direction F and from the front edge 52F of the palm rest pad 52 in the rear direction R. Further, the storage space 38A is accessible in the vehicle lateral direction from the side edge 52S of the palm rest pad 52 in the side direction S1. As such, the storage space 38A is accessible from both the front direction F and the rear direction R, in the vehicle longitudinal direction, and from the side direction S1 in the vehicle lateral direction.

As such, the palm P of the user may rest on the palm rest pad 52 while access to the storage space 38A underneath the palm rest pad 52 is accessible from both the front direction F and the rear direction R, in the vehicle longitudinal direction, and from the side direction S1 in the vehicle lateral direction. Therefore, the palm P of the user is provided with a rest when the fingers FT of the user operate the inputs 40A of the human machine interface 40, while access to the storage space 38A is not inhibited from the front direction F, the rear direction R, or the side direction S1.

Further, as the wireless charging unit 44 is provided at the storage space 38A the electronic device 46 of the user may be wireless charged when the electronic device 46 is placed in the storage space 38A. In some embodiments, the storage recess 38 includes a contact wall 45 having an upper surface 45A and an opposite lower surface 45B. The electronic device 46 contacts the upper surface 45A and the wireless charging unit 44 contacts the lower surface 45B. In some embodiments, the contact wall 45 is formed as part of the console panel 30. In some embodiments, the contact wall 45 and the upper surface 45A are formed as part of the wireless charging unit 44 that is installed within the storage recess 38.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A palm rest assembly of a console assembly for a vehicle, the center console assembly including a console frame, the palm rest assembly comprising:
    a palm rest bracket having a generally C-shape, the palm rest bracket including a base wall, a side wall, and an upper wall, the base wall mounted to the console frame, the side wall extending between the base wall and the upper wall such that the upper wall is cantilevered, the palm rest bracket extends in a vehicle lateral direction such that a space below the upper wall is accessible from a front direction of the palm rest pad in a vehicle longitudinal direction; and
    a palm rest pad coupled to the upper wall.
2. The palm rest assembly of claim 1, wherein the palm rest bracket extends in the vehicle lateral direction such that the space below the upper wall is accessible from a rear direction of the palm rest pad in the vehicle longitudinal direction and only one lateral side direction of the palm rest pad in the vehicle lateral direction.
3. The palm rest assembly of claim 2, wherein the palm rest pad includes a substrate having a first connector that slidably engages with a second connector on the upper wall in the vehicle lateral direction, and
    wherein the substrate includes a bore and the upper wall includes a through-bore, the substrate is secured to the upper wall by a fastener that extends through the through-bore of the upper wall and the bore of the substrate to inhibit the palm rest pad from sliding with respect to the upper wall.
4. The palm rest assembly of claim 3, wherein the palm rest pad includes a cover layer and an intermediate layer, the intermediate layer positioned between the substrate and the cover layer.
5. The palm rest assembly of claim 4, wherein the side wall includes an exterior surface and an opposite interior surface, the interior surface facing the space below the upper wall, at least a portion of the interior surface being covered in a surface coating layer.
6. The palm rest assembly of claim 5, further comprising a cover panel coupled to the palm rest bracket such that the cover panel covers at least a portion of the exterior surface of the side wall.
7. The palm rest assembly of claim 2, wherein the base wall, the side wall, and the upper wall of the palm rest bracket are formed as a one piece monolithic structure.
8. A console assembly for a vehicle, the console assembly comprising:
    a console frame fixed to a floor of the vehicle;
    a palm rest bracket having a generally C-shape, the palm rest bracket including a base wall, a side wall, and an upper wall, the base wall mounted to the console frame, the side wall extending between the base wall and the upper wall such that the upper wall is cantilevered;
    a console panel coupled to the console frame, the console panel positioned between the upper wall and the base wall; and
    a palm rest pad coupled to the upper wall.
9. The console assembly of claim 8, wherein the console panel includes a recess that defines a storage space positioned between the upper wall and the base wall,
    wherein the palm rest bracket extends in a vehicle lateral direction such that the storage space is accessible from a rear direction of the palm rest pad in a vehicle longitudinal direction, a front direction of the palm rest pad in the vehicle longitudinal direction, and only one lateral side direction of the palm rest pad in the vehicle lateral direction.
10. The console assembly of claim 9, wherein the console panel includes a human machine interface configured to be operated by a finger of a user, the human machine interface being positioned forward of the palm rest pad in the vehicle longitudinal direction such that a palm of the user rests on the palm rest pad when the finger of the user operates the human machine interface.
11. The console assembly of claim 10 further comprising a wireless charging unit configured to wirelessly transmit electric power to an electronic device disposed within the storage space.
12. The console assembly of claim 11, wherein the wireless charging unit is positioned at the storage space between the upper wall and the base wall.

13. The console assembly of claim 10, wherein the palm rest pad includes a substrate, a cover layer, and an intermediate layer positioned between the substrate and the cover layer.

14. The console assembly of claim 13, wherein the substrate includes a bore and the upper wall includes a through-bore, the substrate is secured to the upper wall by a fastener that extends through the through-bore of the upper wall and the bore of the substrate to inhibit the palm rest pad from sliding with respect to the upper wall.

15. The console assembly of claim 10, wherein the side wall includes an exterior surface and an opposite interior surface, the interior surface facing the space below the upper wall, at least a portion of the interior surface being covered in a surface coating layer.

16. The console assembly of claim 15, comprising a cover panel coupled to the palm rest bracket such that the cover panel covers at least a portion of the exterior surface of the side wall.

17. The console assembly of claim 9, wherein the base wall, the side wall, and the upper wall of the palm rest bracket are formed as a one piece monolithic structure.

18. A vehicle comprising:
a passenger compartment;
a console frame within the passenger compartment, the console frame fixed to a floor of the vehicle;
a palm rest bracket having a generally C-shape, the palm rest bracket including a base wall, a side wall, and an upper wall, the base wall mounted to the console frame, the side wall extending between the base wall and the upper wall such that the upper wall is cantilevered;
a console panel coupled to the console frame, the console panel positioned between the upper wall and the base wall; and
a palm rest pad coupled to the upper wall.

19. The vehicle of claim 18, wherein the console panel includes a recess that defines a storage space positioned between the upper wall and the base wall, and
wherein the palm rest bracket extends in a vehicle lateral direction such that the storage space is accessible from a rear direction of the palm rest pad in a vehicle longitudinal direction, a front direction of the palm rest pad in the vehicle longitudinal direction, and only one lateral side direction of the palm rest pad in the vehicle lateral direction.

20. The vehicle of claim 19, wherein the console panel includes a human machine interface configured to be operated by a finger of a user, the human machine interface being positioned forward of the palm rest pad in the vehicle longitudinal direction such that a palm of the user rests on the palm rest pad when the finger of the user operates the human machine interface.

* * * * *